United States Patent

Masuyama

[15] 3,693,470
[45] Sept. 26, 1972

[54] POWER STEERING MECHANISM

[72] Inventor: Toshio Masuyama, 1155, Okazu-cho, Totuka-ku, Yokohama-shi, Kanagawa-ken, Japan

[22] Filed: Dec. 9, 1970

[21] Appl. No.: 96,570

[30] Foreign Application Priority Data

Dec. 9, 1969 Japan ..................... 44/116325

[52] U.S. Cl. .................... 74/499, 91/375 A, 267/57, 267/154
[51] Int. Cl. ............................................. B62d 1/20
[58] Field of Search ............... 91/375, 375 A; 74/499; 267/154, 57

[56] References Cited

UNITED STATES PATENTS 2,534,621  12/1950  Panhard ..................... 267/154

FOREIGN PATENTS OR APPLICATIONS 878,212  9/1961  Great Britain ............. 267/154

*Primary Examiner*—Milton Kaufman
*Attorney*—Saul Jecies

[57] ABSTRACT

A torsion bar system is provided for a power steering mechanism which makes use of liquid pressure for steering operation. The torsion bar system comprises a torsion bar and two brims joined to both ends thereof, at least one brim being joined to one end of the torsion bar via a tube covering the torsion bar and the brims being closely opposed to each other. Such two brims have a plurality of recessed portions on their respective peripheries, which are different in phase and in which projections from input and output members are received and held so that the torsion bar system may be easily incorporated in the power steering mechanism with initial load being applied to the torsion bar and so that torsion may be given over the full length thereof in handling operation.

3 Claims, 5 Drawing Figures

TOSHIO MASUYAMA, INVENTOR.

BY SAUL JECIES,
his Attorney

INVENTOR.
TOSHIO MASUYAMA

BY SAUL JECIES,
his Attorney

POWER STEERING MECHANISM

BACKGROUND OF THE INVENTION

This invention relates to a power steering mechanism, and more particularly to a torsion bar system which imparts a mechanical reacting force to a steering wheel in the power steering mechanism of a liquid pressure type.

In conventional devices of this kind it is widely known to use a torsion bar mechanism for producing a mechanical reaction force. However, in such prior-art devices a torsion bar is twisted at each base end thereof with respect to input and output members, which are connected thereto at an angle of zero degrees therebetween. When a steering wheel is turned right or left under this condition, the torsion bar is twisted to the right or left as desired, so that a mechanical reacting force may be imparted to the steering wheel by making use of the torsion thus produced in the torsion bar. Thus, the magnitude of such a reacting force varies in proportion to a changing angle of twisting of the torsion bar, and the angle of twisting of the torsion bar (indicated as a displacement of a valve) depends on the resistance of the vehicle tires (indicated as the magnitude of load pressure) to a change in their running direction. If such an elastic constant is chosen for the tension bar that the optimum reacting force may be imparted in a standard condition when the resistance of tires against a change in their running direction is relatively small with low load pressure, as in high-speed driving, then operation of the steering wheel must become unusually hard owing to the excessive reacting force when the resistance is high with high load pressure, as in low-speed driving or while rolling at extreme low speed. To the contrary, if such an elastic constant is chosen for the torsion bar that the optimum reacting force may be given in a standard condition when the resistance of such tires against a change in their running direction is high, then operation of the steering wheel must become too loose owing to the reacting force being too small when the resistance is low, as in high-speed driving. Consequently, stability in driving is lost.

For eliminating such defects an elastic constant is chosen for the torsion bar, such that the optimum reacting force may be obtained in a standard condition when load pressure is high, by giving previously to the torsion bar a suitable angle of twisting or initial load for producing a specific desired reacting force in high-speed driving with low load pressure and setting it between the input and output members. Furthermore, in this manner clear perception of the neutral position of the steering wheel is made, and its return thereto after steering operation is improved. Still furthermore, the reacting force, which gradually increases during steering operation, thus is more quickly able to reach a level of its desired value.

Up to now, a device disclosed in U.S. Pat. No. 3,273,465 granted to Robert T. Eddy has been known solely as means with this purpose. In this device a torsion bar has an arm extending radially at the center, which divides the torsion bar into two portions and is related to imput and output members to which the torsion bar is fixed at both ends, with initial load previously applied thereto, so that either of the two portions of the torsion bar may be twisted selectively as desired when a steering wheel is turned left or right, whereby a reacting force is imparted to the steering wheel. Thus, in this device such disadvantages as described above may be certainly eliminated since initial load can be applied previously to the torsion bar. On the other hand, half the full length of the torsion bar is twisted selectively when the steering wheel is turned right or left, and therefore, only the half portion of the torsion bar is utilized practically to produce a reacting force. Accordingly, the length of the torsion bar must be limited so as to be incorporated in a power steering mechanism limited in dimensions, and also the thickness must be reduced to the minimum in diameter, which is determined by the strength concerned. Thus, it is rather difficult to provide a low elastic constant for the torsion bar, for the purpose of imparting the optimum reacting force while the vehicle is rolling at extreme low speed. It is not possible for this device to be applied to all power steering mechanisms, which are used in different sizes in large or small automobiles.

Furthermore, the arm formed at the center of the torsion bar is related to the input and output members, and the torsion bar is fixed at both of its ends to both of such members. Therefore, assembly work for the device thus arranged must be done by inserting the input and output members from the ends of the torsion bar to their designated positions, relating the members to the arm at the center thereof, and fixing the torsion bar at its ends to the members respectively, applying thereto externally some torsion for initial load. It is a disadvantage that such assembly work is very hard to do and requires a lot of labor and time.

SUMMARY OF THE INVENTION

The primary object of this invention is to provide an improved torsion bar system for power steering mechanisms of this kind, in which a torsion bar can be twisted always over the full length thereof when a steering wheel is turned right or left, and which can be incorporated easily with respect to input and output members with initail load being applied to the torsion bar. To achieve this in accordance with this invention, a torsion bar system is formed of a torsion bar and two brims connected to both ends thereof, at least one of the brims being connected to one end of the torsion bar through a tube covering the torsion bar and the brims being closely opposed to each other, such brims having a plurality of recessed portions on their respective peripheries which are different in phase, and in which projections formed on the input and output members are set with the torsion bar being twisted previously in one direction in such a manner that each is pressed and held at one edge wall and at other edge wall opposite thereto of such recessed portions with gaps left between the projections on the input and output members and such walls. In this manner the torsion bar can be incorporated easily into the input and output members with initial load being applied thereto, and also twisted always over the full length through the two brims and the tube in response to a change in the angular relation between the input and output members in steering operation.

BRIEF DESCRIPTION OF THE DRAWINGS

The above and other objects, features, and functions of this invention will be more apparent form the following description taken in conjunction with the accompanying drawings in which.

DETAILED DESCRIPTION OF PREFERRED EMBODIMENTS

Figure 1:
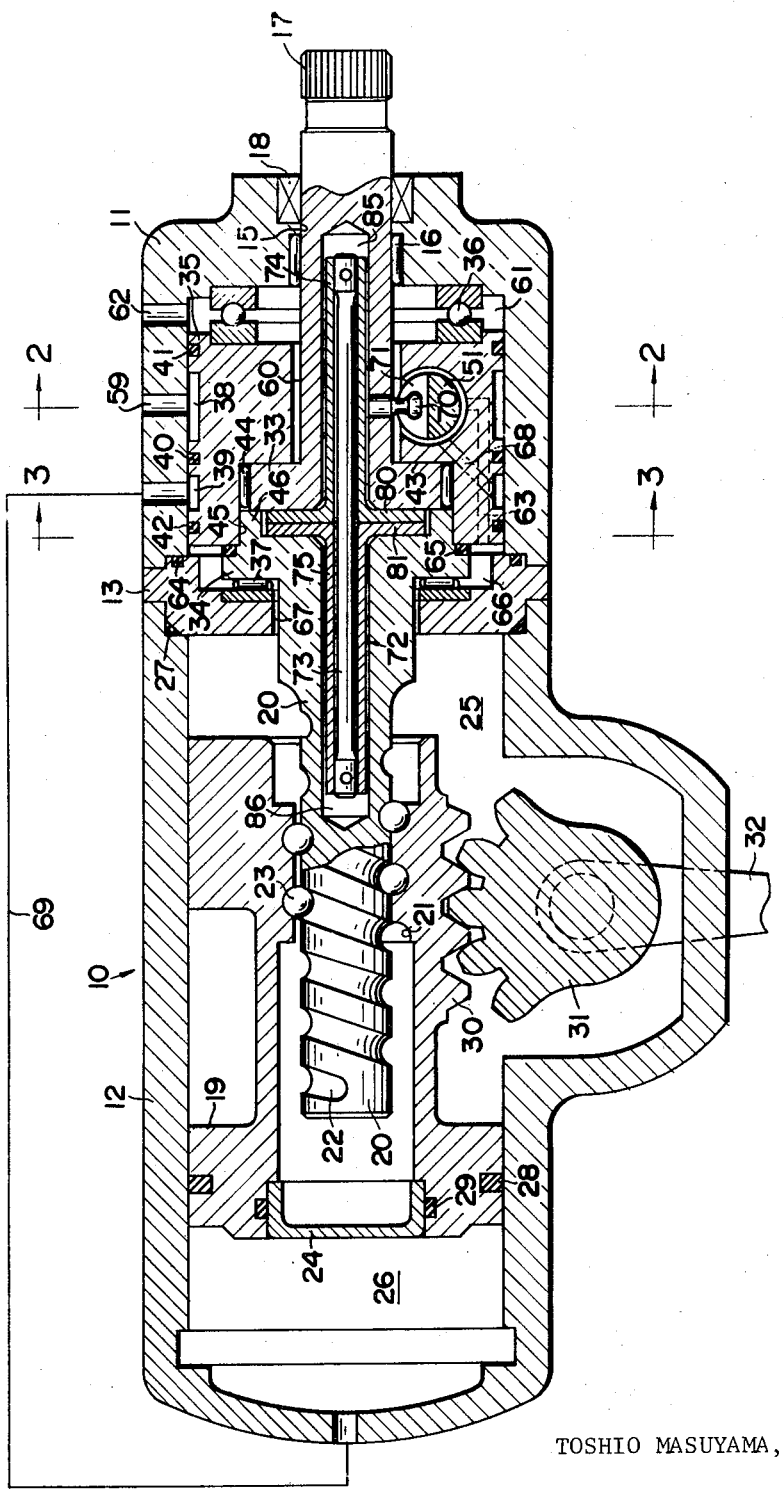
FIG. 1 is a longitudinal sectional view of a power steering mechanism provided with a torsion bar system formed in accordance with this invention.

FIG. 1 shows one embodiment of a power steering mechanism 10 provided with a torsion bar system in longitudinal section in accordance with this invention.

Figure 2:
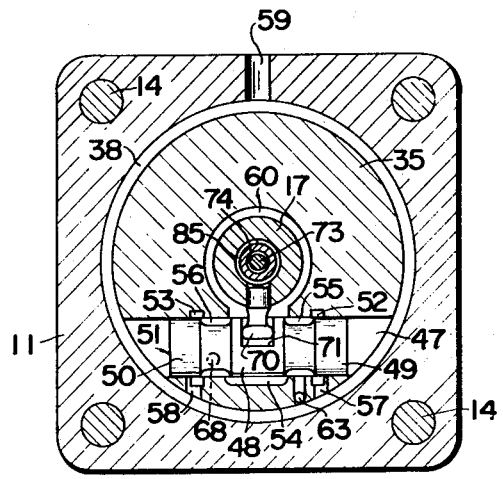
FIG. 2 is a cross-sectional view thereof taken substantially along a line 2 — 2 in FIG. 1.
Figure 3:
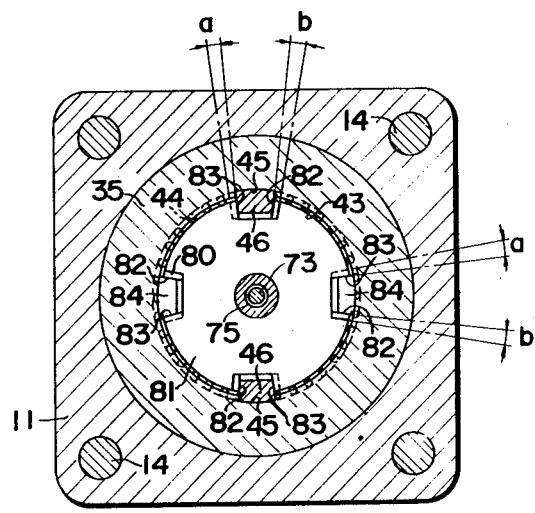
FIG. 3 is a cross-sectional view thereof taken substantially along a line 3 — 3.

The power steering mechanism 10 has a case consisting of a valve housing 11, a pressure chamber housing 12, and a partition 13 inserted therebetween, which are combined integrally by means of bolts 14 (see FIGS. 2 and 3). The valve housing 11, as will be described subsequently, contains a valve system therein. A stub shaft 17 used as an input member is supported rotatably on a needle bearing 16 mounted on the inner wall of a through hole 15 made at one end of the valve housing 11. The base end of the stub shaft 17 (the right side in FIG. 1) extends from the outer surface of the valve housing 11 to the right, so as to be connected to a steering wheel (not shown). The extended portion of the stub shaft 17 is sealed by means of an oil seal 18 mounted on the inner wall of the through hole 15.

On the other hand, the pressure chamber housing 12 is for forming a power cylinder, in which a piston 19 is inserted. Through the axial center of this piston 19 is inserted a screw shaft 20 used as an output member. A number of balls 23 are inserted between feeding threads 21 and 22 formed on the inner wall of the piston 19 and on the outer surface of the screw shaft 20 in such a manner that the piston 19 and the screw shaft 20 may be engaged movably to each other. A cap 24 is fixed at one end of the piston 19 (at the left in FIG. 1), and the inside of the pressure chamber housing 12 is separated into two pressure chambers 25 and 26 with the piston 19. These two pressure chambers 25 and 26 are hermetically sealed by means of a seal 27 inserted between the pressure chamber housing 12 and the partition 13, a seal 28 provided on the outer periphery of the piston 19 against the inner wall of the chamber 12, and a seal 29 provided on the inner wall of piston 19 against the outer periphery of the cap 24. The piston 19 has a rack 30 formed by cutting the lower side of the piston 19, which is engaged with a sector gear 31. Thus, when the piston 19 is pushed forward or backward with liquid pressure applied to either of the pressure chambers 25 and 26, the sector gear 31 is turned by means of the rack 30 on the piston 19, with the screw shaft 20 being simultaneously rotated through the feeding threads 21 and 22 and the balls 23, so that tires (not shown) may be controlled to turn in and direction through a pitman arm 32 joined to the sector gear 31.

The stub shaft 17 used as the input member is alined with the screw shaft 20 used as the output member, and the base end of the screw shaft 21 passes through the partition 13, extending into the valve housing 11. Discs 33 and 34 are provided in opposition to each other integrally with and at the inner end of the stub shaft 17 and at the base end of the screw shaft 20 respectively.

The valve system contained in said valve housing 11 has a valve housing means 35 inserted rotatably therein so as to slide in contact with the inner wall of the valve housing 11.

The valve housing means 35 is prevented from moving axially by means of a ball thrust bearing 36 inserted between the means 35 and the right inner wall of the valve housing 11 and by means of a needle thrust bearing 37 inserted between the means 35 and the partition 13 via the disc 34 on the screw shaft 20. The valve housing means 35 also has two annular grooves 38 and 39 on the outer periphery with seals 40, 41, and 42 mounted thereon between them and at two ends, in such a manner that two separate annular paths may be formed between the two annular grooves 38 and 39 and the inner wall of the valve housing 11. A hole 43 is provided at one end of the valve housing means 35, in which the disc 33 on the stub shaft 17 is set on a needle bearing 44 mounted between the inner wall of the hole 43 and the disc 33. As shown in FIG. 3, grooves 45 are formed at the open end of the hole 43, with which projections 46 provided on the disc 34 on the screw shaft 20 are engaged, so that the screw shaft 20 and the valve housing means 35 may be rotated together all the time without causing any change in their angular relation.

Furthermore, the valve housing means 35, as shown in FIG. 2, has a valve hole 47 passing crosswise therethrough in a position off the center, in which a valve spool 51 having three lands 48, 49, and 50 is inserted slidably so as to divide the inside into five rooms 52, 53, 54, 55 and 56. As shown clearly in FIG. 1 and 2 the rooms 52 and 53 at right and left sides communicate with a liquid pressure source through holes 57 and 58 made on the valve housing means 35, an annular groove 38, which is a circular path formed between the valve housing 11 and the valve housing means 35, and a supply port 59 formed by drilling the valve housing 11, while the room 54 at the center communicates with a reservoir through a gap 60 around the stub shaft 17 passing through the axial center of the valve housing means 35, a space 61 between the valve housing 11 and the valve housing means 35, and a drain port 62 formed by drilling the valve housing 11. The room 55 always communicates with the right pressure chamber 25 in the pressure chamber housing 12 through a hole 63 made on the valve housing means 35, a space 66 between the partition 13 sealed by means of seals 64 and 65 and the valve housing means 35, and a gap 67 between the partition 13 and the screw shaft 20, while the room 56 communicates all the time with the left pressure chamber 26 in the pressure chamber housing 12 through a hole 68 made on the valve housing means 35, the annular path 39, which is a circular path formed between the valve housing 11 and the valve housing means 35, and a pipe path 69. When the room 55 is let to communicate with the liquid pressure source through hole 57, annular groove 38, and supply port 59 by meeting the room 52 only with the valve spool 51 which may move right or left along the valve hole 47 in the valve housing means 35, the room 56 may communicate with the room 54 only and then with the reservoir through gap 60, space 61, and drain port 62. On the other hand, when the room 56 is let to communicate with the room 53 only, and then with the liquid pressure source through hole 58, annular groove 38, and supply port 59, the room 55 may communicate with the room 54 only to be open to the reservoir. The rooms 55 and 56 are so arranged as described above.

For moving the valve spool 51 as desired along the valve hole 47 in the valve housing means 35 in response to the turning direction of a steering wheel, a guide pin 70 fixed on the stub shaft 17 is inserted tightly without any gap into a cut-out portion 71 formed on the center land 48 on the valve spool 51 from the lower opening of the gap 61 between the stub shaft 17 and the valve housing means 35. Thus, the valve spool 51 can be controlled as desired along the valve hole 47 in the valve housing means 35 through the guide pin 70 in response to a change in the angular relation between the stub shaft 17 and the valve housing means 35.

Now assume that the stub shaft 17 is given a right turn (anticlockwise in FIG. 2) by turning a steering wheel to the right. Then, the motion is transmitted to tires through the screw shaft 20, which is joined integrally to the valve housing means 35 through the projection 46 set in the groove 45, piston 19, sector gear 31, and pitman arm 32.

However, the tire-carrying wheels may still run as before because of their resistance against such turning motion, and the stub shaft 17 only is turned right making a change in its angular relation to the valve housing means 35. As a result, the valve spool 51 is shifted to the right (in FIG. 2) through the guide pin 70, and pressure liquid from the liquid source through the supply port 59 is supplied to the right pressure chamber 25 through annular groove 38, through hole 57, room 52, room 55, through hole 63, space 66, and gap 67. At the same time the left pressure chamber 26 is connected from the pipe path 69 to the reservoir through annular groove 39, through hole 68, room 53, room 54, gap 60, space 61, and drain port 62. As the valve housing means 35 is turned right or anticlockwise in FIG. 2 through the screw shaft 20, the piston 19 is moved to the left by liquid pressure in the right pressure chamber 25. With the sliding to the left of the piston 19 the wheels are turned to the right through the sector gear 31 and the pitman arm 32. When the stub shaft 17 is given a left turn by turning the steering wheel, the valve spool 51 is shifted to the left (in FIG. 2) likewise but reversely. As a result, such paths are connected reversely so as to supply the pressure liquid from the pressure liquid source to the left pressure chamber 26 and open the right pressure chamber 25 to the reservoir. Thus, the piston 19 is moved to the right by liquid pressure produced in the left pressure chamber 26, turning the screw shaft 20 and the valve housing means 35 together with the wheels to the left through the sector gear 31 and the pitman arm 32. It will be clear that the wheels can be turned as desired by help of such liquid pressure as to be produced as the steering wheel is turned.

Figure 4:
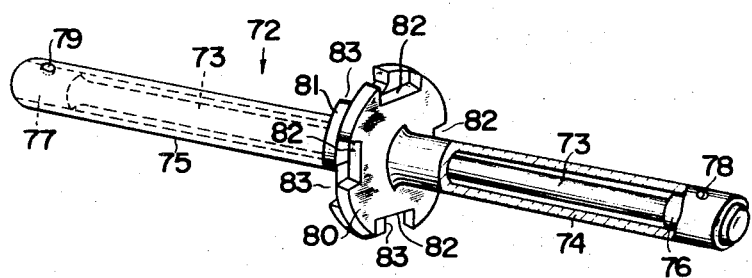
FIG. 4 is a pictorial view of the torsion bar system itself partly cut out.

In this invention a torsion bar system is employed for the purpose of maintaining a normal designated space relation between the stub shaft 17 as an input member and the screw shaft 20 as an output member or keeping the valve spool 51, as shown in FIG. 2, in the condition that the rooms 55 and 56 are let to communicate with the rooms 52 and 53 at the same time, and imparting a mechanical reactive force to the steering wheel. The torsion bar system 72, as shown in FIG. 4, comprises a torsion bar 73 and tubes 74 and 75, in which the torsion bar 73 is inserted and which are fitted thereto at the both ends formed into thicker portions 76 and 77 where the torsion bar 73 is fixed integrally with pins 78 and 79. At the inward ends of the tubes 74 and 75 are integrally provided disc-like flanges 80 and 81 having four recessed portions 82 and 83 respectively formed at intervals of 90 degrees on the periphery thereof, which are suitably arranged in position. In such recessed portions 82 and 83 are inserted with gaps, as shown in FIG. 3, projections 84 formed integrally with and on the periphery of the disc 33 on the stub shaft 17 and projections 46 formed integrally with and on the periphery of the disc 34 respectively.

The torsion bar system 72 is incorporated into the stub shaft 17 and the screw shaft 20 by inserting the right and left tubes 74 and 75 into holes 85 and 86 made along their axial centers respectively, setting the projections 84 formed on the disc 33 on the stub shaft 17 into the right and left recessed portions 82 on the brim 80 on the torsion bar system 72 and the projections 46 on the disc 34 on the screw shaft 20 into the upper and lower recessed portions 83 on the brim 81 on the same system 72, and then holding and turning the stub shaft 17 and the screw shaft 20 oppositely to each other, pushing them axially in the direction of their meeting, so that the recessed portions 82 and 83 on the brims 80 and 81 are brought to their designated relative positions where the projections 84 and 46 on the stub shaft 17 and on the screw shaft 20 fall and set into the recessed portions 82 and 83 on the brims 80 and 81. Under this condition, as shown in FIG. 3, the projections 84 and 46 are pressed and held stably at right and left edge walls of the recessed portions 82 and 83 respectively with some gaps (a) and (b) left between the projections 84 and 46 and left and right edge walls of the recessed portions 82 and 83 by the righting couple of the torsion bar 73. In this manner the torsion bar system 72 can be easily built in a power steering mechanism, as shown in FIG. 1, under the condition that initial load is kept so applied thereto.

With such arrangement as described above, a mechanical reacting force imparted by the torsion bar system 72 is transmitted to a car driver as a perceptible force. In other words, when the stub shaft 17 is turned right through a steering wheel, the projections 84 formed on the disc 33 of the stub shaft 17 are turned anticlockwise in FIG. 3 with the projections 46 formed on the disc 34 of the screw shaft 20 kept to stay due to the resistance of the wheels against such turning motion. Consequently, in the torsion bar system 72 the brim 81 only is turned anticlockwise together with the projections 84 while the other brim 80 is kept still by means of the projections 46, and the torsion bar 73 is more twisted in the same direction of torsion previously given thereto over the full length through the tubes 74 and 75. On the other hand, when the stub shaft 17 is turned left through the steering shaft, the brim 80 only is turned clockwise in FIG. 3 together with the projections 84, while the brim 81 is kept still by means of the projections 46. Consequently the torsion bar 73 is more twisted likewise in the same direction of torsion previously given over the full length through the tubes 74 and 75.

In either case a reacting force produced by the torsion of the torsion bar 73 is imparted to a car driver as a mechanical perceptible force through either of the brims 80 and 81, projections 84, stub shaft 17, and steering wheel. At the same time the valve spool 51 is shifted as designated in response to a change in the angular relation between the stub shaft 17 and the valve housing means 35, and the pressure liquid from the pressure liquid source is supplied selectively to either of the right and left pressure chamber 25 and 26, as already described above. Consequently the wheels are turned as desired.

Furthermore, a limited relative rotary motion is allowed between the stub shaft 17 and the screw shaft 20 thanks to such idle motion as arise between the recessed portions 82 on the brim 80 and the projections 84 when the steering wheel is turned right, and such idle motion as arises between the recessed portions 83 and the projections 84 when the steering wheel is turned left. Thus, if power produced by the liquid pressure becomes insufficient, mechanical driving may be made directly between the stub shaft 17 and the screw shaft 20.

Figure 5:
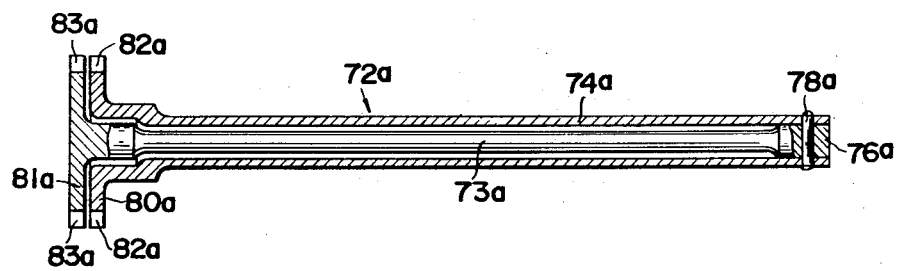
FIG. 5 is a longitudinal sectional view showing another form of a torsion bar system in accordance with this invention.

What has been described so far is about the case of the torsion bar system 72 so constructed as illustrated in FIG. 4. This may be replaced by such a torsion bar system 73a as shown in FIG. 5, which comprises a torsion bar 73a with a brim 81a formed directly at one end thereof, and a tube 74a covering the torsion bar 73a and having a brim 80a at one end thereof in opposition to the brim 81a on the torsion bar 73a, said tube 74a having the base end joined integrally to the thicker portion 76a which is the base end of the torsion bar 73a by means of a pin 78a, said brims 80a and 81a having recessed portions 82a and 83a formed thereon.

In the above embodiment the piston 19 used as a fluid motor is incorporated in the power steering mechanism. It will be understood that this may be substituted by a power steering mechanism, which has a liquid pressure cylinder used as such a liquid motor separated therefrom and provided between the fixed portion on the car body and part of the steering mechanism.

What is claimed is:

1. In a power steering mechanism, in combination, a torsion bar having spaced end portions; a pair of axially adjacent flanges extending radially of said torsion bar and each operatively connected with one of said end portions, said flanges each having a circumference; a plurality of circumferentially spaced first recesses provided in said circumference of one of said flanges, and a plurality of circumferentially spaced second recesses provided in said circumference of the other of said flanges and each initially angularly offset with reference to said first recesses; and an input and an output member having respective pluralities of circumferentially spaced projections each of which is of lesser circumferential dimension than said recesses, the projections of one of said members being received in said first recesses and the projections of the other member being received in said second recesses after application of torsion to said torsion bar of sufficient magnitude to effect axial alignment of the respective first and second recesses, whereby said projections of said one member abut against one and are spaced from the opposite circumferential side bounding said first recesses, and said projections of said other member abut against the opposite and are spaced from the one circumferential side bounding said second recesses, so that said torsion bar may be twisted over its full length for increasing the reaction force produced by twisting when said input member is turned in one or the other opposite circumferential direction.

2. In a power steering mechanism as defined in claim 1, one of said flanges being provided on one end portion of said torsion bar; and further comprising a tubular element surrounding said torsion bar and having one end fixedly connected with the other end portion of said torsion bar, and another end provided with the other of said flanges.

3. In a power steering mechanism as defined in claim 1, said flanges extending radially of said torsion bar intermediate said end portions thereof; and further comprising a pair of tubular elements surrounding said torsion bar and each having one end provided with one of said flanges and another end fixedly connected with one of said end portions of said torsion bar.

* * * * *